W. G. Warden,
Oil Still
No. 110,806. Patented Jan. 3, 1871.
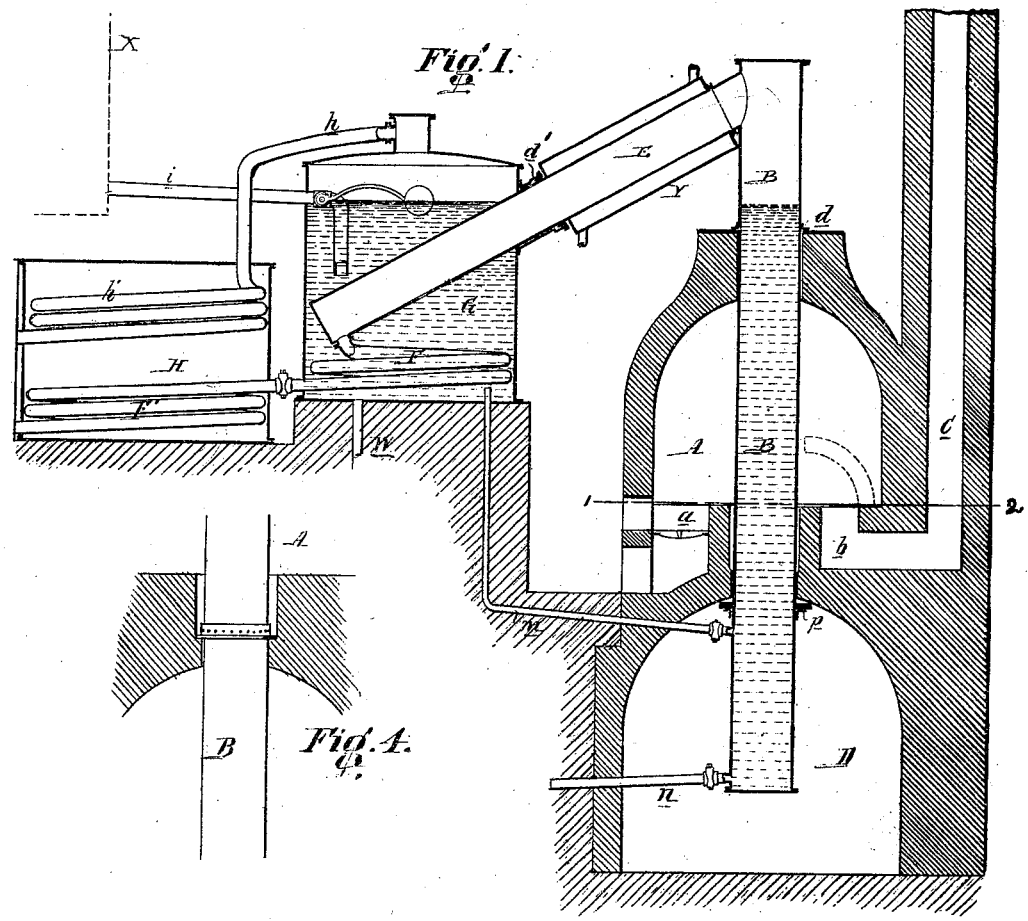
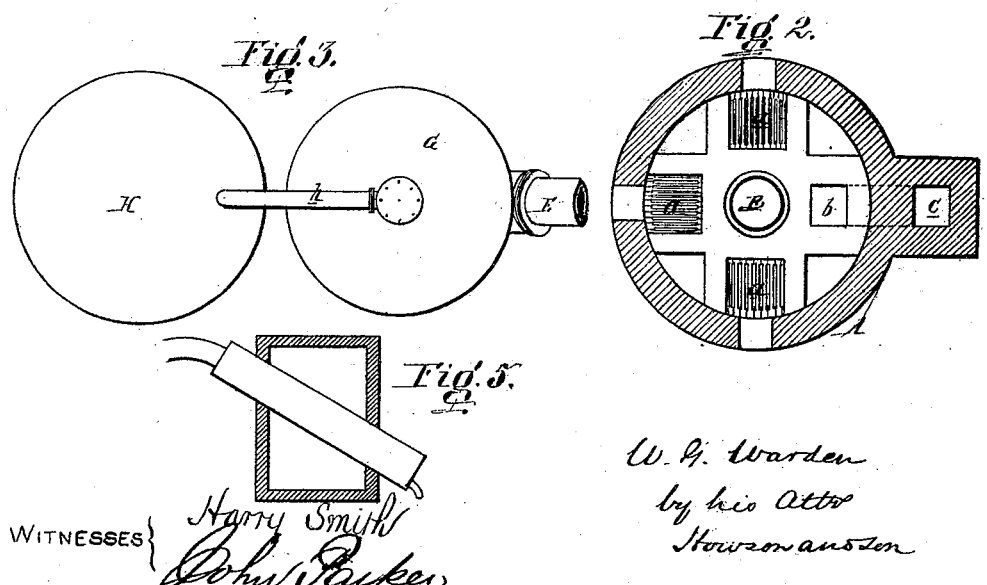
Witnesses: Harry Smith, John Parker
W. G. Warden
by his Att'y
Howson and Son

United States Patent Office.

WILLIAM G. WARDEN, OF PHILADELPHIA, PENNSYLVANIA.

Letters Patent No. 110,806, dated January 3, 1871.

IMPROVEMENT IN APPARATUS AND PROCESSES FOR DISTILLING OIL.

The Schedule referred to in these Letters Patent and making part of the same.

I, WILLIAM G. WARDEN, of Philadelphia, county of Philadelphia, State of Pennsylvania, have invented an Improved Oil-Still, of which the following is a specification.

Nature and Object of the Invention.

My invention consists of an oil-still, constructed and operating in a manner too fully explained hereafter to need preliminary explanation, the main object of my invention being the extraction of all the volatile matters from the oil, the saving of fuel, the preservation of the still from rapid destruction by the action of the fire, and a continuous distillation when desired.

Description of the Accompanying Drawing.

Figure 1 is a vertical section of my improved oil-still;

Figure 2, a sectional plan of the furnace on the line 1 2;

Figure 3, a plan view of condensers;

Figure 4, a vertical section, illustrating a modification of my invention; and

Figure 5, a diagram illustrating another modification.

General Description.

A is the furnace, which, in the present instance, is of a circular form, and at the base of which are three fire-places, *a a a*, all communicating with the interior of the furnace and with a flue, *b*, by which the products of combustion are carried off to the chimney *c*.

On the arched top of the furnace bears a flange, *d*, secured to the still B, which consists of a long hollow cylinder of plate-iron or steel, the said cylinder passing entirely through the furnace, through the base of the same, and terminating within a chamber, D, formed beneath the furnace.

A pipe, E, extends from the upper end of the still B, through a stuffing-box, *d'*, on the tank G, and, within the latter, communicates with a worm, F, the tube of which passes into another tank, H, containing cold water, and is there coiled into another worm, F', and finally passes through the said tank.

From the top of the tank G a pipe, *h*, passes into the tank H, is there coiled, and passes from the tank, as shown in fig. 1.

Oil is introduced from an elevated reservoir, X, into the tank G, through a pipe, *i*, bent at the end, and furnished with a cock connected to a float-lever, by means of which the oil is maintained at a uniform height in the tank, the same level being maintained in the still as the process of distillation continues, owing to the pipe *m*, which affords a direct communication between the said still and the lower portion of the tank G.

Ordinary petroleum-stills consist of large vessels, directly to the under side of which the products of combustion are applied, and from the bottom of which the residuum is withdrawn through what is known as a "tar-pipe," which extends below, and is protected from, the fire. Owing to the application of the heat to the lowest part of the still, an incrustation of the residuum collects on and adheres to the bottom of the vessel to such an extent that not only is an enormous quantity of fuel required to impart the desired heat to the still, but the rapid destruction of the latter, owing to the presence of the non-conducting incrustation, takes place.

It will be observed that a portion only of the still B is exposed to heat in the fire-chamber of the furnace, the lower portion below the same being a receptacle for the retention of the residuum, which, being free from exposure to direct heat, cannot become incrusted, but may be drawn off, in a fluid or semi-fluid state, through the pipe *n* when the still is to be cleansed.

A flange, *p*, is secured to the still, at or near the roof of the chamber D, and the hole in the base of the furnace, through which the still passes, is larger in diameter than the still itself, so that there may be an intervening annular space for the reception of a body of sand, which, resting on the flange *p*, will form a sufficiently tight joint to prevent air from gaining access to the furnace from the chamber below. At the same time the packing will permit the still to expand and contract without injuring the base or other part of the structure of which the furnace is composed.

If desired, a packing of clay might be interposed between the flange *p* and the roof of the chamber D.

As the oil of the tank G is exposed to the heat of the vapor-pipe E and worm F, it will be deprived of its water and other impurities, which may settle at the bottom, and can be drawn off through a cock, *w*. At the same time the heat of the oil in the tank G is not too great to prevent it from acting as a condensing or partially-condensing medium for the vapor which passes through the worm F, the complete condensation being accomplished in the worm F', which is exposed to the cold water contained in the tank H.

The heat imparted to crude petroleum in the tank G will be sufficient to give off benzine vapor, which, passing through the pipe *h*, will be condensed in the worm *h'*, contained in the water-tank H. This worm and pipe will not be needed in distilling tar or residuum of crude petroleum, although they could be used to advantage when the residuum has been mixed with heavy benzine for re-distillation.

Different qualities of oil require different degrees of heat to enable it to throw off the benzine in the tank G. When a greater heat is required for this purpose than that afforded by the vapor-pipe, I introduce steam or superheated steam into a coil in the tank, to facilitate the generation of benzine vapor; and when the heat of the vapor-pipe E is too great, I introduce into a casing, V, which surrounds it, cold water, the water entering through a pipe from below, and escaping through another pipe above, and the circulation of the water being regulated in accordance with the desired temperature of the oil in the tank G.

One of the most important features of my invention is the peculiar arrangement of the still within the heating-chamber of a furnace—an arrangement which tends to preserve the still, and lessens the consumption of fuel, while that portion of the still beneath the point where the fire is applied affords a receptacle below the fire of such a size as to retain all the heavier particles from which the volatile matters have been removed. This arrangement may be modified, as shown in fig. 4, in which case the still is supported on the base of the furnace; or the still may rest with its extreme lower end on an appropriate foundation, in both of which modifications it will be necessary to so joint the vapor-pipe E as to permit the upward expansion of the still when exposed to heat. For this reason I prefer to support the still on the roof of the furnace, so that it may be at liberty to expand downward without disturbing the vapor-pipe.

In some instances the still may be inclined instead of vertical, as illustrated in the diagram, fig. 5, the arrangement of which will be readily understood without explanation; in all cases, however, the important feature of exposing the central portion of the still only to the fire, so that the portion below may be a receptacle for retaining the residuum, being in all cases adhered to.

It will be seen, without further description, that the process of distillation is continuous in the apparatus above described In ordinary stills the oil is generally introduced at or near the top, so that the heavier matters, which gradually settle to the bottom, are not disturbed, and, being subjected to a constant excessive heat, become coked, coating the heated portions of the still to such a thickness as to effectually prevent the transmission of heat to the remaining contents of the still. On cleansing the still these heavy matters are withdrawn, and are subsequently subjected to a second process of distillation to remove the volatile portions; these operations being repeated until all, or nearly all, the volatile matter is extracted. By my improvement this result is effected at one operation, for the continued introduction of the oil at or near the bottom of the still, through the pipe $m$, causes a current, which carries upward the heavier matters, so that the entire body of fluid within the still is caused to traverse the heated sides until every part which can be volatilized is removed; such heavier particles as no further heating will affect remaining in the chamber below the fire until the still is cleansed.

It will be apparent that this current to carry upward the heavier particles from the receptacle may be created by other means.

Another important feature of my invention is the application of heat to the vertical parts of the still, which thus afford no lodgment for the heavier matters, so that incrustation is prevented and the efficiency of the entire heated surface of the still is maintained.

Claims.

1. The process of distilling oils, &c., by subjecting the same to the action of heat in a vessel, a portion of which extends below the fire, and in which a constant upward current from the said lower portion is maintained, as described.

2. An oil-still suspended or otherwise arranged within a furnace, so that a portion of the body of the still will project below the fire-chamber, forming a receptacle for retaining the heavier particles below the point where the heat is applied.

3. The combination of the subject-matter of the preceding claim and a feed-pipe, $m$, communicating with the still near the bottom of the same, as set forth.

4. The combination of the furnace A and its fire-places, the chamber D, and still B, supported on the roof of the furnace, and passing through the same into the said chamber D.

In testimony whereof I have signed my name to this specification in the presence of two subscribing witnesses.

WILLIAM G. WARDEN.

Witnesses:
HARRY WARDEN,
WM. A. STEEL.